(12) United States Patent
Estrada et al.

(10) Patent No.: US 11,651,327 B2
(45) Date of Patent: May 16, 2023

(54) DELIVERY DIRECTOR

(71) Applicant: INTERNATIONAL BUSINESS MACHINES CORPORATION, Armonk, NY (US)

(72) Inventors: Adriel Ricardo Estrada, El Cajon, CA (US); Scott John Roberts, Austin, TX (US); Sharif Moustafa Shaker, Castro Valley, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 290 days.

(21) Appl. No.: 16/704,441

(22) Filed: Dec. 5, 2019

(65) Prior Publication Data
US 2021/0174296 A1 Jun. 10, 2021

(51) Int. Cl.
*G06Q 10/08* (2012.01)
*G06Q 10/083* (2023.01)
*G06K 7/10* (2006.01)
*G06Q 10/0834* (2023.01)
*H04W 12/63* (2021.01)

(52) U.S. Cl.
CPC ..... *G06Q 10/0838* (2013.01); *G06K 7/10297* (2013.01); *G06Q 10/0834* (2013.01); *H04W 12/63* (2021.01)

(58) Field of Classification Search
CPC .......... G06Q 10/0838; G06Q 10/0834; H04W 12/63; G06K 7/10297
See application file for complete search history.

(56) References Cited

U.S. PATENT DOCUMENTS

| 7,183,919 | B2 | 2/2007 | Wang | |
|---|---|---|---|---|
| 9,508,239 | B1 | 11/2016 | Harrison | |
| 2005/0068181 | A1 | 3/2005 | Wang | |
| 2009/0085745 | A1 | 4/2009 | Gupta | |
| 2015/0156031 | A1 | 6/2015 | Fadell | |
| 2016/0292635 | A1* | 10/2016 | Todasco | H04W 4/023 |
| 2016/0350702 | A1* | 12/2016 | Matula | G06Q 30/0635 |

(Continued)

FOREIGN PATENT DOCUMENTS

WO 2016109838 A1 7/2016

OTHER PUBLICATIONS

Information Week, "CSK Auto Replaces Paper Forms With Digital Data; Auto-parts retailer replaces paper forms with a system that scans bar codes and uses digital photos to provide proof of delivery," CMP Media, Inc., Apr. 26, 2005.*

(Continued)

*Primary Examiner* — Nathan Erb
(74) *Attorney, Agent, or Firm* — Rakesh Roy

(57) ABSTRACT

A method, computer system, and a computer program product for delivery is provided. The present invention may include detecting a carrier device within a vicinity of a user address associated with at least one registered beacon unit. The present invention may also include transmitting a respective tag information of the at least one registered beacon unit associated with the user address to the detected carrier device in the vicinity of the user address. The present invention may further include, in response to receiving a delivery event communication from the at least one registered beacon unit, recording a completed delivery at the user address.

18 Claims, 8 Drawing Sheets

(56) References Cited

U.S. PATENT DOCUMENTS

| | | | |
|---|---|---|---|
| 2018/0097797 A1* | 4/2018 | Hoyer | H04L 9/321 |
| 2018/0114420 A1* | 4/2018 | Siminoff | G08B 13/19606 |
| 2018/0146336 A1* | 5/2018 | Hoyer | G07C 9/28 |
| 2018/0234531 A1* | 8/2018 | Ekkel | G08B 13/22 |
| 2019/0118652 A1* | 4/2019 | Wiedemann | B60K 37/06 |
| 2021/0019699 A1* | 1/2021 | Bornski | G08G 5/025 |

OTHER PUBLICATIONS

Disclosed Anonymously, "Home Delivery Beacon System for Accurate and Secure Package Delivery," An IP.com Prior Art Database Technical Disclosure, IP.com No. IPCOM00258821D, Jun. 18, 2019, 4 pages.

Well et al., "The NIST Definition of Cloud Computing", National Institute of Standards and Technology, Special Publication 800-145, Sep. 2011, 7 pages.

* cited by examiner

DELIVERY DIRECTOR

BACKGROUND

The present invention relates generally to the field of computing, and more particularly to locating technology.

With the growth and demand for online shopping and home deliveries, the number of packages being dropped off at the wrong location is increasing. While Global Positioning System (GPS) technology may assist the driver for most of the way, confusion may still exist in knowing exactly where to make a drop-off. In some instances, the address on a house may be missing or obscured, the address in the GPS may be incorrect, or the ordering of addresses may not be intuitive, leading to confusion.

SUMMARY

Embodiments of the present invention disclose a method, computer system, and a computer program product for delivery. The present invention may include detecting a carrier device within a vicinity of a user address associated with at least one registered beacon unit. The present invention may also include transmitting a respective tag information of the at least one registered beacon unit associated with the user address to the detected carrier device in the vicinity of the user address. The present invention may further include, in response to receiving a delivery event communication from the at least one registered beacon unit, recording a completed delivery at the user address.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
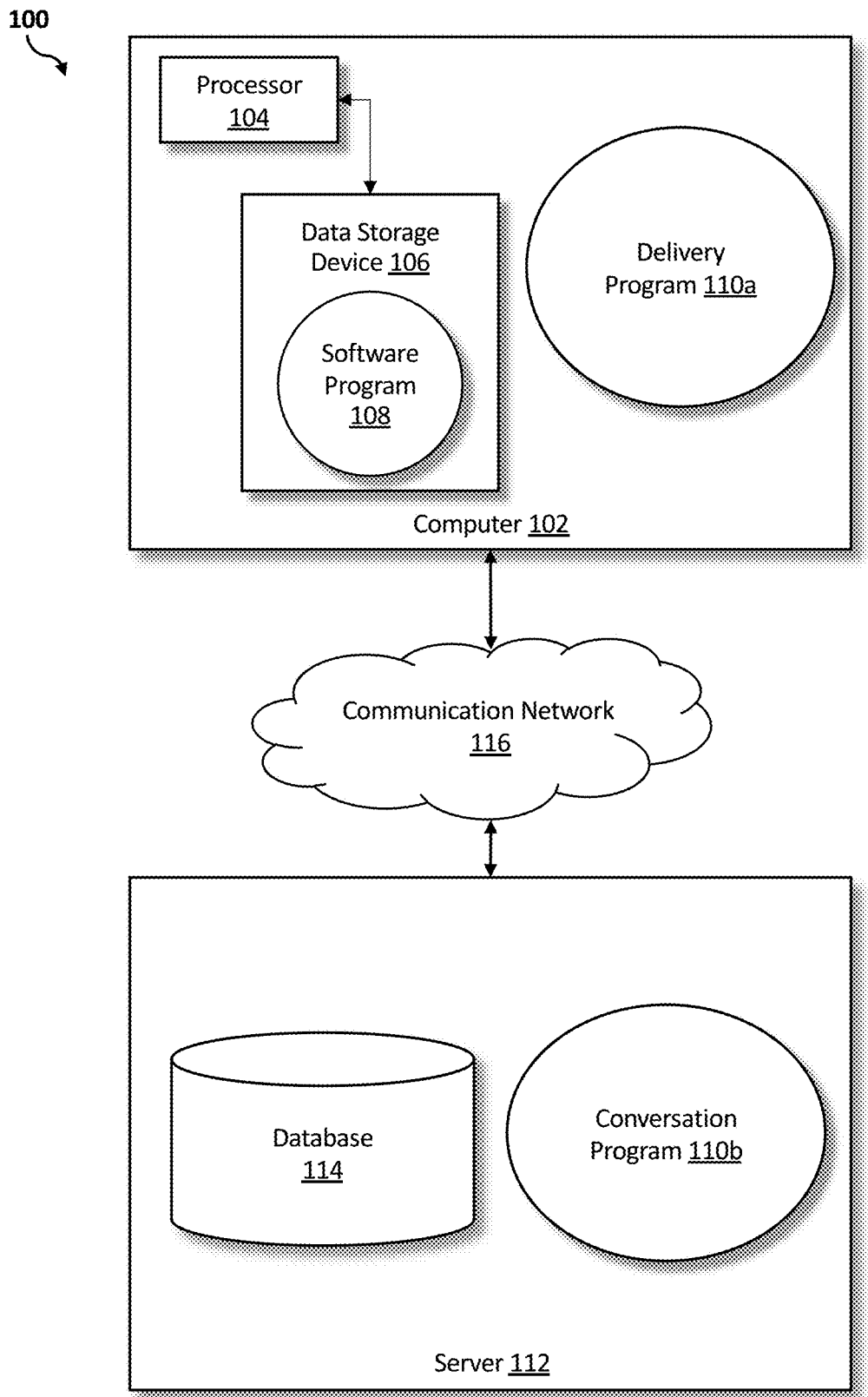
FIG. 1 illustrates a networked computer environment according to at least one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, Python, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method and program product for directing a delivery. As such, the present embodiment has the capacity to improve the field of location and delivery technology by directing a delivery to a specific drop-off location at a user address. More specifically, a user may install a beacon unit on an exterior wall or door of the user's facility where an item may be dropped off for delivery. Then, a delivery program may register the beacon unit with a user address of the user's facility. Then, the delivery program may detect a carrier device of a carrier delivering a package to the user address. The delivery program may transmit a tag identifier of the registered beacon unit to the carrier device. The carrier device may communicate with the registered beacon unit using the tag identifier. In response to receiving a communication from the carrier device, the registered beacon unit may emit a distinguishable signal to the carrier device to direct the carrier to the delivery drop-off location. Then, in response to receiving an input on the registered beacon unit from the carrier, the registered beacon unit may capture a photograph of the delivered package to record a completed delivery. Thereafter, the delivery program may transmit a notification to a user device to confirm the completed delivery of the package at the delivery drop-off location.

As described previously, with the growth and demand for online shopping and home deliveries, the number of packages being dropped off at the wrong location is increasing. While GPS may assist the driver for most of the way, confusion may still exist in knowing exactly where to make a drop-off. In some instances, the address on a house may be missing or obscured, the address in the GPS may be incorrect, or the ordering of addresses may not be intuitive, leading to confusion. Accordingly, the present disclosure may provide a solution for directing delivery carriers to the exact delivery drop-off location using various location detection and tracking technologies. In one embodiment, the present disclosure may incorporate technologies such as radio frequency identification (RFID) technology, near-field communication (NFC) technology, GPS technology, and Bluetooth® (Bluetooth and all Bluetooth-based trademarks and logos are trademarks or registered trademarks of Bluetooth SIG, Inc. and/or its affiliates) technology.

Therefore, it may be advantageous, to among other things, provide a way to associate a beacon unit to a user address and activate the beacon unit for directions to the user address for deliveries. It may also be advantageous to provide a delivery program which may automatically facilitate communications between the beacon unit and a carrier service delivering to the user address.

According to one embodiment, a user may connect a beacon unit to a home wireless network using a companion application of a delivery program. In one embodiment, the user may register the beacon unit with the delivery program as well as a carrier service associated with the delivery program. The user may install the beacon unit on any exterior wall where the user may want packages delivered. The beacon unit may be installed using an adhesive on the back of the beacon unit or an optional mount which may be attached to the exterior wall using one or more screws. The user may then place an order for a delivery, for example, using an online retail store. In one embodiment, an RFID tag identifier of the beacon unit may be transmitted to the delivery program. When a carrier arrives to make the delivery, the delivery program may detect the carrier and transmit the RFID tag identifier to a carrier device. Then, the carrier device may communicate with the beacon unit for directions to the delivery location. In one embodiment, the carrier may request audio signals from the beacon unit to direct the carrier to the delivery location. Once at the delivery drop-off location, the carrier may press a button on the beacon unit to record the completed delivery.

Referring to FIG. 1, an exemplary networked computer environment 100 in accordance with one embodiment is depicted. The networked computer environment 100 may include a computer 102 with a processor 104 and a data storage device 106 that is enabled to run a software program 108 and a delivery program 110a. The networked computer environment 100 may also include a server 112 that is enabled to run a delivery program 110b that may interact with a database 114 and a communication network 116. The networked computer environment 100 may include a plurality of computers 102 and servers 112, only one of which is shown. The communication network 116 may include various types of communication networks, such as a wide area network (WAN), local area network (LAN), a telecommunication network, a wireless network, a public switched network and/or a satellite network. It should be appreciated that FIG. 1 provides only an illustration of one implementation and does not imply any limitations with regard to the environments in which different embodiments may be implemented. Many modifications to the depicted environments may be made based on design and implementation requirements.

The client computer 102 may communicate with the server computer 112 via the communications network 116. The communications network 116 may include connections, such as wire, wireless communication links, or fiber optic cables. As will be discussed with reference to FIG. 6, server computer 112 may include internal components 902a and external components 904a, respectively, and client computer 102 may include internal components 902b and external components 904b, respectively. Server computer 112 may also operate in a cloud computing service model, such as Software as a Service (SaaS), Platform as a Service (PaaS), or Infrastructure as a Service (IaaS). Server 112 may also be located in a cloud computing deployment model, such as a private cloud, community cloud, public cloud, or hybrid cloud. Client computer 102 may be, for example, a mobile device, a telephone, a personal digital assistant, a netbook, a laptop computer, a tablet computer, a desktop computer, or any type of computing devices capable of running a program, accessing a network, and accessing a database 114. According to various implementations of the present embodiment, the delivery program 110a, 110b may interact with a database 114 that may be embedded in various storage devices, such as, but not limited to a computer/mobile device 102, a networked server 112, or a cloud storage service.

Figure 2:
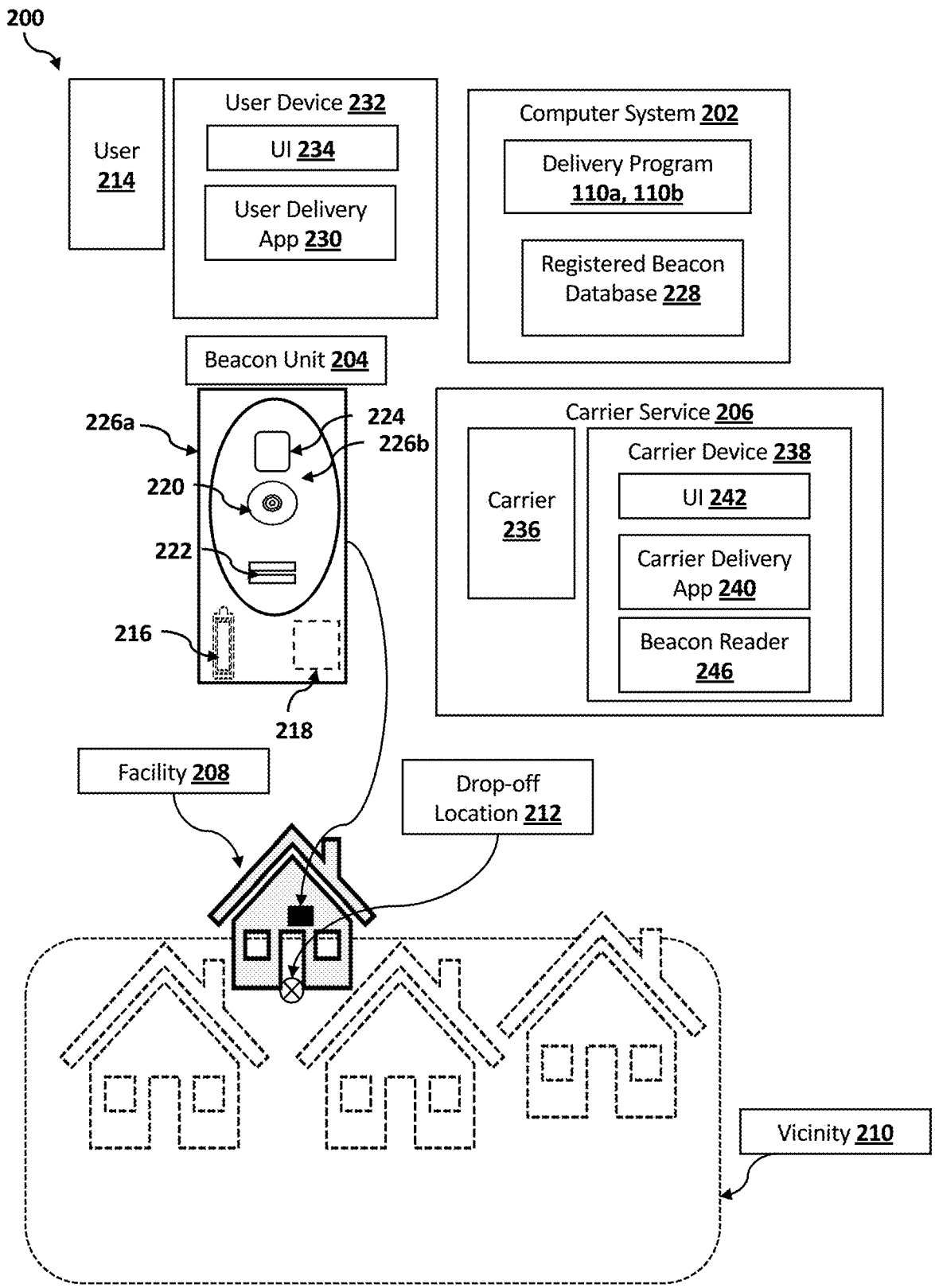
FIG. 2 is a schematic block diagram of a delivery system according to at least one embodiment.

Referring now to FIG. 2, a schematic block diagram of a delivery system 200 implementing the delivery program 110a, 110b according to at least one embodiment is depicted.

According to one embodiment, the delivery system 200 may include a computer system 202 (e.g., client computer(s) 102 and/or server computer(s) 112) having a tangible storage device that is enabled to run the delivery program 110a, 110b. In one embodiment, the delivery program 110a, 110b may include a single computer program or multiple program modules or sets of instructions being executed by the processor of the computer system 202. The delivery program 110a, 110b may include routines, objects, components, units, logic, data structures, and actions that may perform particular tasks or implement particular abstract data types. The delivery program 110a, 110b may be practiced in distributed cloud computing environments where tasks are performed by remote processing devices that may be linked through a communication network (e.g., communication network 116). In one embodiment, the delivery program 110a, 110b may include program instructions that may be collectively stored on one or more computer-readable storage media.

According to one embodiment, the delivery system 200 may also include a beacon unit 204 and a carrier service 206 in communication with the delivery program 110a, 110b. In one embodiment, the beacon unit 204 may be associated with a facility 208 and the carrier service 206 may be tasked with delivering a package to the facility 208. The delivery program 110a, 110b may communicate with the carrier service 206 to enable the carrier service 206 to detect the beacon unit 204 and determine a location of the facility 208. For example, the carrier service may be unable to locate the facility 208 using a facility address. In one embodiment, the carrier service 206 may communicate with the delivery program 110a, 110b to indicate arrival of the carrier service 206 at or near the facility address 208. In one embodiment, arrival near the facility address 208 may include arrival within a vicinity 210 (e.g., within the same block or street) of the facility 208. After detecting the carrier service 206, the delivery program 110a, 110b may transmit tag information of the beacon unit 204 to the carrier service 206 which may enable the carrier service 206 to ping the beacon unit 204 for directions to the facility 208. In response, the beacon unit 204 may emit distinguishable signals to direct the carrier service 206 to a drop-off location 212 at the facility 208.

According to one embodiment, the facility 208 may be associated with a user 214 and may include, for example, a housing facility, an office facility, a warehouse facility, or any other building facility where the user 214 may want a package delivered. In one embodiment, the beacon unit 204 may be assigned to a specific location of the facility 208 which may enable the carrier service 206 to identify the drop-off location 212 of the facility 208.

According to one embodiment, the beacon unit 204 may include a cradle 226a housing a battery 216 and an electronic tag 218. In some embodiments, the beacon unit 204 may also include a camera 220 enabled to take a photograph of a delivered package, a speaker 222 enabled to transmit sound, and a button 224 or similar interface which the carrier service 206 may engage to indicate the delivered package. In one embodiment, the beacon unit 204 may include a cover 226b which may be removed to access the cradle 226a and replace the battery 216 housed therein.

According to one embodiment, the tag 218 of beacon unit 204 may include a radio frequency identification (RFID) tag. In one embodiment, the RFID tag types may include: a passive tag, an active tag, or a battery-assisted passive tag. The tag 218 may include an integrated circuit for storing and processing information (e.g., from RF signals) and an antenna for receiving and transmitting signals. In one embodiment, the tag 218 may store beacon or tag information (e.g., in non-volatile memory), which may include, for example, a unique identification (ID) value. In one embodiment, the unique ID value may include a string of characters and/or numbers (e.g., serial number) which may be implemented to identify and communicate with a respective beacon unit 204.

According to one embodiment, the user 214 may install one or more beacon units 204 on exterior surfaces of the facility 208 using adhesives or other mounting devices (e.g., screws). Each beacon unit 204 may be associated with the facility 208 and more particularly, may be assigned to identify corresponding drop-off locations 212 of the facility 208 using the delivery program 110a, 110b. More specifically, the delivery program 110a, 110b may enable the user 214 to register one or more beacon units 204 with the facility 208 and store the registered beacon units 204 in a registered beacon database 228 of the computer system 202. In one embodiment, the delivery program 110a, 110b may include a user delivery application 230 which may be enabled to run on a user device 232 (e.g., mobile device, a kiosk, a car dashboard, a voice response unit, or any other form factor of client computer 102) as a frontend application (e.g., web application).

The user device 232 may include a user interface (UI) 234. According to one embodiment, the UI 234 may include a web interface or a graphical user interface (GUI) configured to display (e.g., output) graphical or textual data from the user delivery application 230 running on the user device 232. In one embodiment, the UI 234 may also provide an input device to enable the user 214 to interact with the user delivery application 230 (e.g., by entering text or voice input or by selecting user options) running on the user device 232.

In one embodiment, the beacon unit 204 may include a network component (not shown) and may be enabled to connect to the user delivery application 230 via a communication network (e.g., Wi-Fi) of the facility 208. In one embodiment, the beacon unit 204 may transmit the tag information (e.g., unique ID value) to the user delivery application 230. The user delivery application 230 may automatically detect an address of the facility (e.g., via location service) or prompt the user 214 to enter the facility address using the UI 234 of the user device 232. In one embodiment, the delivery program 110a, 110b may receive the tag information of the beacon unit 204 and the facility address of the facility 208 and execute a registration of the beacon unit 204 with the facility 208. As noted above, the delivery program 110a, 110b may maintain the registered beacon database 228 in the computer system 202. The registered beacon database 228 may include a user profile for each user 214. In one embodiment, the user profile may include the facility address of the facility 208 and indicate one or more registered beacon units 204 (e.g., using the unique ID value) associated with the facility 208. In at least one embodiment, the user profile may include a description (e.g., front door, back yard, red door) of the drop-off location 212 associated with the registered beacon unit 204, based on information received from the user 214. In one embodiment, the delivery program 110a, 110b may enable the user 214 to select or input when a particular drop-off location 212 may be used for package delivery, based on, for example, a delivery day/time, a monetary value of the package being delivered, and/or a size of the package being delivered. The delivery program 110a, 110b may store the user preferences associated with the drop-off locations in the registered beacon database 228.

According to one embodiment, the carrier service 206 may include a carrier 236 delivering the package to the facility 208 and an associated carrier device 238 enabled to locate the registered beacon unit 204. The carrier device 238 may include, for example, a mobile device, a kiosk, a car dashboard, a voice response unit, or any other form factor of client computer 102. In one embodiment, the delivery program 110a, 110b may include a carrier delivery application 240 which may be enabled to run on the carrier device 238 as a frontend application (e.g., web application). In one embodiment, the carrier device 238 may also include a UI 242 and a beacon reader 246.

According to one embodiment, the beacon reader 246 may include an RFID reader that may be enabled to detect and read RFID tags within a corresponding coverage area of the RFID tags (e.g., tag 218). In one embodiment, the RFID reader may transmit an encoded radio signal to interrogate RFID tags, which may receive the signal and respond with identification and other information stored in the RFID tags. RFID reader types may include, for example, passive reader active tag (PRAT) type, active reader passive tag (ARPT) type, and active reader active tag (ARAT) type.

According to one embodiment, the delivery program 110a, 110b may detect the carrier device 238 in the vicinity of the facility 208. In one embodiment, the carrier 236 may interact with the carrier delivery application 240 to indicate arrival of the carrier 236 in the vicinity of the facility 208. In one embodiment, the carrier device 238 may share location data with the carrier delivery application 240 such that the delivery program 110a, 110b may automatically detect the carrier device 238 in the vicinity of the facility 208 on arrival.

According to one embodiment, the delivery program 110a, 110b may transmit the tag information of the registered beacon unit 204 associated with the facility 208. In one embodiment, the delivery program 110a, 110b may transmit the tag information of the registered beacon unit 204 in response to receiving a request from the carrier device 238 for the tag information. After receiving the tag information from the delivery program 110a, 110b, the beacon reader 246 may be enabled to communicate with the registered beacon unit 204 corresponding to the tag information (e.g., unique ID value).

According to one embodiment, the beacon unit 204 may recognize the carrier device 238 and emit one or more distinguishable signals to direct the carrier 236 to the drop-off location 212 of the facility 208. In one embodiment, the beacon unit 204 may transmit an audio signal (e.g., series of beeps, custom music, custom message describing what the drop-off location looks like) from the speakers 222. For example, the audio may become more frequent as the carrier 236 approaches the correct drop-off location 212 with a voice saying "Thank you, please place my package behind the potted plant on your left" as the carrier 236 comes within a feet of the beacon unit 204. In another embodiment, the beacon unit 204 may transmit light (e.g., flashing color, solid colored light) from a flash component of the camera 220. Once at the drop-off location 212, the carrier 236 may press the button 224 on the beacon unit 204 to record the completed delivery. In one embodiment, the beacon unit 204 may capture a photograph of the delivered package using the camera 220 when the button 224 is pressed by the carrier 236.

Figure 3:
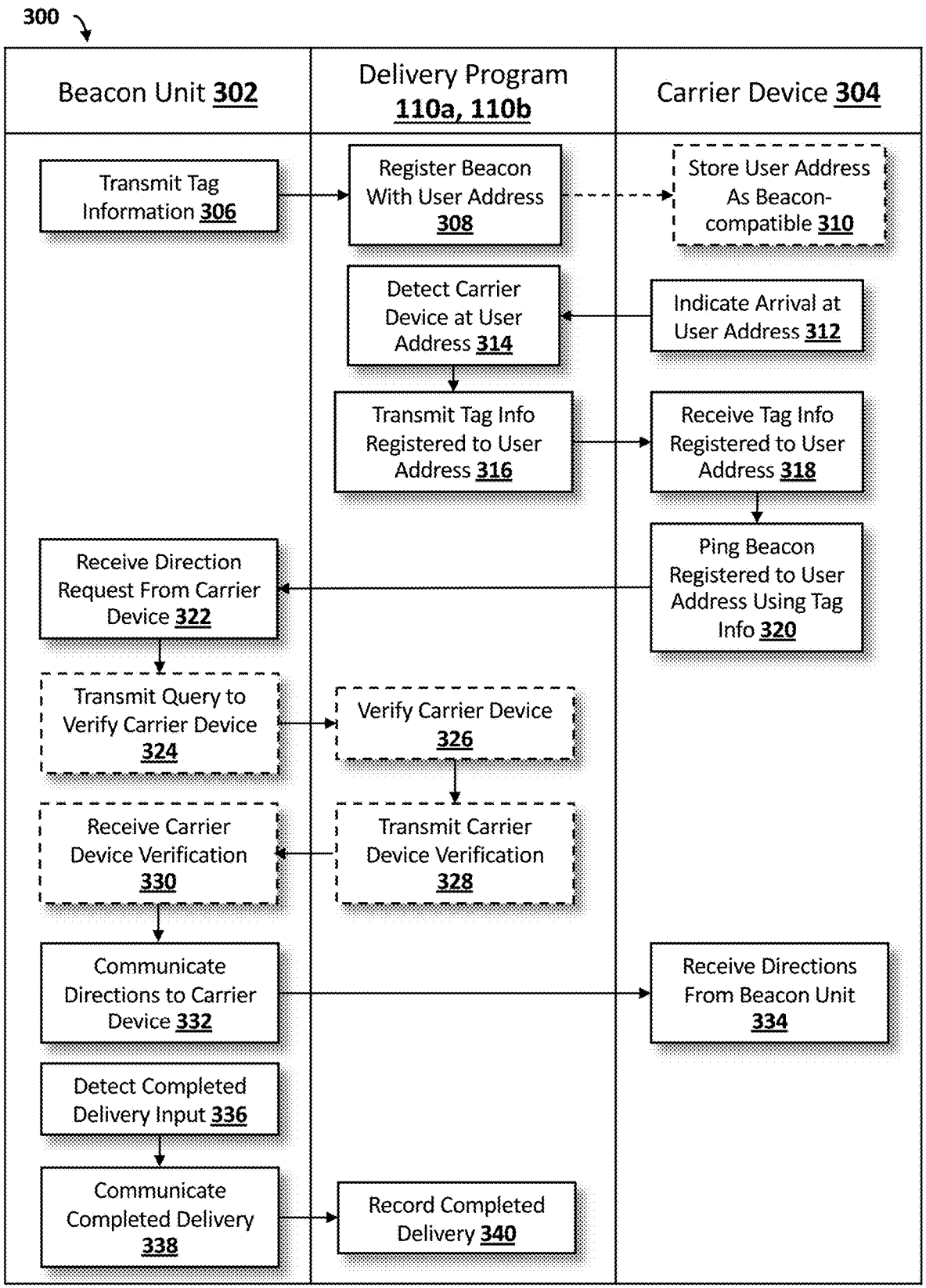
FIG. 3 is a swim lane diagram illustrating an exemplary delivery process according to at least one embodiment.

Referring now to FIG. 3, a swim lane diagram illustrating an exemplary delivery process 300 implemented by the delivery system according to at least one embodiment is depicted. FIG. 3 illustrates the interactions between a beacon unit 302, the delivery program 110a, 110b, and a carrier device 304.

At 306, the beacon unit 302 may transmit a tag information to the delivery program 110a, 110b. In one embodiment, a user may interact with a companion application (e.g., user delivery application 230) of the delivery program 110a, 110b running on a user device to register the beacon unit 302 with a user address (e.g., of facility 208). The beacon unit 302 may connect to the companion application of the delivery program 110a, 110b via a communication network of the user address and transmit the tag information to the delivery program 110a, 110b. The tag information may include a unique ID value of the beacon unit 302 which may be used to communicate with the beacon unit 302 from amongst multiple other beacon units.

At 308, the delivery program 110a, 110b may register the beacon unit 302 with the user address. The delivery program 110a, 110b may generate a user profile associated with the user address in a registered beacon database (e.g., registered beacon database 228). The user profile may include the user address and may indicate each beacon unit 302 installed in the user address based on the corresponding tag information received from the beacon units 302. The delivery program 110a, 110b may enable the user to assign (e.g., via the companion application) the beacon unit 302 to a corresponding drop-off location (e.g., drop-off location 212) at the user address. In at least one embodiment, if multiple beacon units 302 are registered for the user address (e.g., multiple drop-off locations), the delivery program 110a, 110b may enable the user to indicate the conditions around when a specific drop-off location may be used from amongst the other drop-off locations. In one embodiment, the companion application of the delivery program 110a, 110b may enable the user to enter user preferences for specific drop-off locations based on the delivery day/time, the number of delivered packages, the value of the delivered package, and/or the size of the delivered package. Accordingly, for each registered beacon unit 302 associated with the user address, the delivery program 110a, 110b may store the tag information (e.g., unique ID value), a description of the drop-off location, and user preferences associated with the drop-off location.

At 310, the carrier device 304 may optionally store the user address as beacon-compatible. In one embodiment, the delivery program 110a, 110b may partner with one or more carrier services (e.g., carrier service 206) for the delivery process. As such, the delivery program 110a, 110b may enable the user to register the beacon units 302 with the carrier service. Then, the carrier device 304 (e.g., server of the carrier service) may store the user address as including one or more beacon units 302.

At 312, the carrier device 304 may indicate arrival of the carrier (e.g., carrier 236) at the user address for delivery. In one embodiment, the delivery program 110a, 110b may transmit a request to the carrier service to deliver a package to the user address. In another embodiment, the user of the beacon unit 302 may transmit a request to the carrier service to deliver a package to the user address. In at least one embodiment, another service (not specifically illustrated, e.g., online retailer or physical store) integrating the delivery program 110a, 110b (e.g., via application programming interface (API)) may transmit a request to the carrier service to deliver a package to the user address.

In one embodiment, the carrier may interact with a companion application (e.g., carrier delivery application 240) of the delivery program 110a, 110b running on the carrier device (e.g., carrier device 304) to indicate arrival at or near the user address. In another embodiment, the carrier device 304 may automatically share its location with the delivery program 110a, 110b via the companion application running on the carrier device 304.

At 314, the delivery program 110a, 110b may detect the carrier device 304 at the user address. In one embodiment, the delivery program 110a, 110b may detect the carrier device 304 based on the indication received from the carrier device 304 at 312.

At 316, the delivery program 110a, 110b may transmit the tag information of the beacon units 302 registered to the user address to the carrier device 304. In one embodiment, the delivery program 110a, 110b may query the registered beacon database to identify the beacon units 302 registered with the user address. The delivery program 110a, 110b may then transmit the record (retrieved from the registered beacon database) associated with the user address to the carrier device 304. In one embodiment, the record transmitted to the carrier device 304 may include the tag information (e.g., unique ID value) of the registered beacon unit 302 and a description of the drop-off location assigned to the registered beacon unit 302. In one embodiment, if the record includes multiple registered beacon units 302 corresponding to multiple drop-off locations at the user address, the delivery program 110a, 110b may check the user preferences associated with the drop-off locations to determine which beacon unit 302 tag information to transmit to the carrier device 304. For example, for a 10 AM delivery to a user address where the user address includes three registered beacon units 302, the delivery program 110a, 110b may transmit the tag information of the first beacon unit 302 based on a user preference for the corresponding first drop-off location for deliveries before noon.

In another embodiment, if the record includes multiple registered beacon units 302 corresponding to multiple drop-off locations at the user address, the delivery program 110a, 110b may transmit the tag information for the multiple registered beacon units 302 and the corresponding drop-off locations to the carrier device 304. The delivery program 110a, 110b may enable the carrier to select the drop-off location from the list of drop-off locations based on the user preferences associated with the delivery day/time, the number of delivered packages, the value of the delivered package, and/or the size of the delivered package.

At 318, the carrier device 304 may receive the tag information of the beacon units 302 registered to the user address. In one embodiment, the carrier device 304 may list the tag information received from the delivery program 110a, 110b in a display component of the carrier device 304. In one embodiment, the carrier device 304 may receive the tag information of a single beacon unit 302 registered to the user address. In another embodiment, the carrier device 304 may receive tag information of multiple beacon units 302 registered to the user address. The tag information may indicate the drop-off location assigned to the corresponding beacon unit 302 and any user preferences associated with the drop-off location as described above.

At 320, the carrier device 304 may ping the beacon unit 302 registered to the user address using the tag information. In one embodiment, the carrier device 304 may include an RFID reader (e.g., beacon reader 246) which may communicate with an RFID tag (e.g., tag 218) of the beacon unit 302. The RFID reader may receive a unique ID value (e.g., in the tag information) and transmit an encoded radio signal to interrogate the RFID tag having the unique ID value. By using the unique ID value, the RFID reader may singulate the beacon unit 302 with the RFID tag having the unique ID value from other RFID tags in the coverage area of the RFID reader.

At 322, the beacon unit 302 registered with the user address may receive a direction request from the carrier device 304. In one embodiment, the RFID tag of the beacon unit 302 may detect the presence of the carrier device 304 based on the unique ID value included in the query matching the unique ID value of the RFID tag.

At 324, the beacon unit 302 may transmit a query to the delivery program 110a, 110b to verify (e.g., authenticate) the carrier device 304 requesting the directions to the user address. Then at 326, the delivery program 110a, 110b may verify the carrier device 304. In one embodiment, the delivery program 110a, 110b may include a database storing a list of the authorized carrier services. In another embodiment, the registered beacon database may include a record of the carrier services authorized to deliver to each user address. Accordingly, the delivery program 110a, 110b may query the database of authorized carrier services or the registered beacon database to determine if the carrier device 304 is authorized to communicate with the beacon unit 302. After verifying the carrier device 304 at 326, at 328, the delivery program 110a, 110b may transmit the carrier device verification to the beacon unit 302. At 330, the beacon unit 302 may receive the carrier device verification from the delivery program 110a, 110b. According to one embodiment, process 324, process 326, process 328, and process 330 may include optional processes.

At 332, the beacon unit 302 may communicate directions to the carrier device 304. In one embodiment, the beacon unit 302 may transmit distinguishable signals to direct the carrier to the drop-off location at the user address. As previously described with reference to FIG. 2, the beacon unit 302 may transmit audio and/or visual (e.g., light) signals to direct the carrier to the drop-off location.

At 334, the carrier device 304 may receive directions from the beacon unit 302. In one embodiment, the carrier device 304 may enable the carrier to select the type (e.g., audio, visual) of signal received from the beacon unit 302.

At 336, the beacon unit 302 may detect a completed delivery input. In one embodiment, carrier may press a button (e.g., button 224) on the beacon unit 302 to signal a completed delivery. In response, the beacon unit 302 may activate a camera component (e.g., camera 220) to capture a photograph of the delivered package at the drop-off location.

At 338, the beacon unit 302 may communicate the completed delivery with the delivery program 110a, 110b. In one embodiment, the beacon unit 302 may transmit the photo of the delivered package including a timestamp to the delivery program 110a, 110b.

At 340, the delivery program 110a, 110b may record the completed delivery. After receiving the communication from the beacon unit 302, the delivery program 110a, 110b may analyze the photo using image classification to determine the status of the delivered package. After determining that the package is delivered at the correct user address, the delivery program 110a, 110b may transmit a notification to the user device to indicate the completed delivery.

Figure 4:
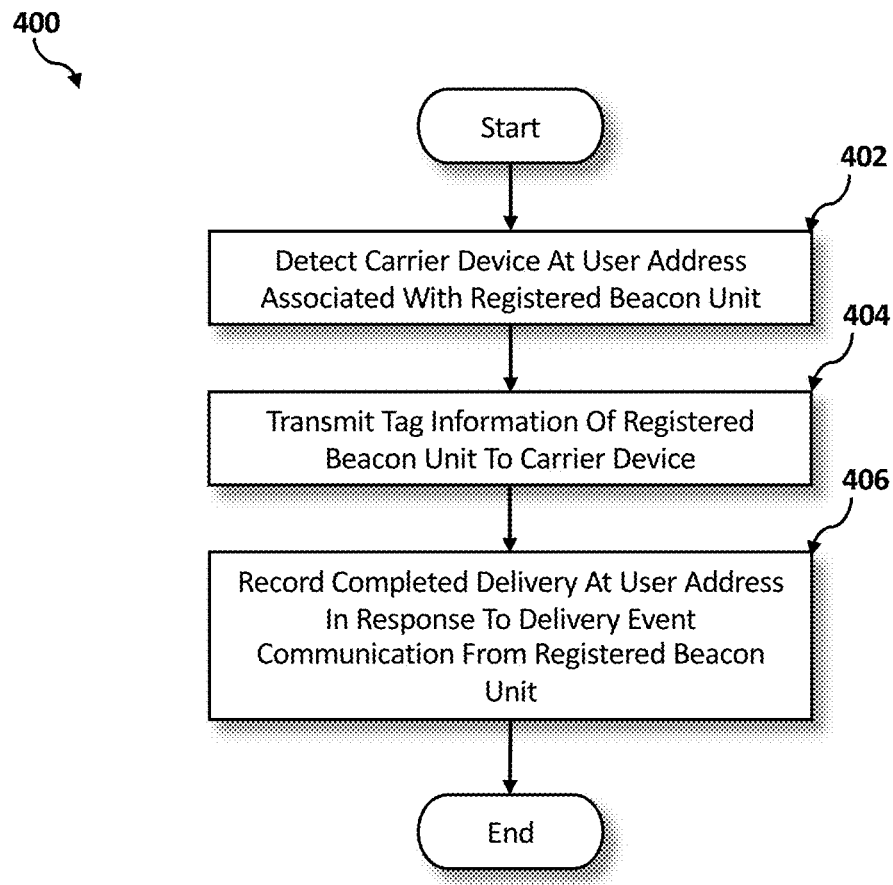
FIG. 4 is an operational flowchart illustrating a process for delivery according to at least one embodiment.

Referring now to FIG. 4, an operational flowchart illustrating the exemplary delivery process 400 used by the delivery program 110a, 110b according to at least one embodiment is depicted.

At 402, a carrier device is detected at a user address associated with a registered beacon unit. In one embodiment, the delivery program 110a, 110b may detect the carrier device based on receiving an indication from the carrier device that the carrier device is at or near the user address as previously described with reference to FIGS. 2 and 3.

Then at 404, a tag information of the registered beacon unit is transmitted to the carrier device. In one embodiment, the delivery program 110a, 110b may query a registered beacon database to identify the beacon unit(s) registered with the user address. The delivery program 110a, 110b may retrieve a record associated with the user address and transmit the record of the registered beacons to the carrier device, as previously described with reference to FIG. 3. In one embodiment, the delivery program 110a, 110b may determine that the user address includes multiple registered beacon units. Then, the delivery program 110a, 110b may transmit a list of the multiple registered beacon units to the carrier device. In one embodiment, the transmitted list may indicate the tag information corresponding to the registered beacon units and a respective drop-off location in the user address corresponding to the registered beacon units. In one embodiment, the carrier may select a drop-off location (e.g., carrier-selected drop-off location) from the list of drop-off locations transmitted to the carrier device. In response to receiving the carrier-selected drop-off location, the delivery program 110a, 110b may provide the carrier device with the tag information (e.g., unique ID value) of the registered beacon unit assigned to the carrier-selected drop-off location.

In another embodiment, the delivery program 110a, 110b may determine one or more user preferences associated with the multiple registered beacon units (and corresponding drop-off locations) of the user address, as described previously with reference to FIG. 3. Based on the user preferences, the delivery program 110a, 110b may identify a user-selected drop-off location from the multiple registered beacon units. Then, the delivery program 110a, 110b may provide the carrier device with the tag information (e.g., unique ID value) of the registered beacon unit assigned to the user-selected drop-off location.

Then at 406, a completed delivery is recorded at the user address in response to a delivery event communication from the registered beacon unit. According to one embodiment, the carrier may press a button on the registered beacon unit which may be detected as a completed delivery input. In response, the registered beacon unit may capture a photograph of the delivered package and transmit the delivery event communication to the delivery program 110a, 110b, as described previously with reference to FIG. 3. After determining that the package is delivered at the correct user address, the delivery program 110a, 110b may record the completed delivery.

Figure 5:
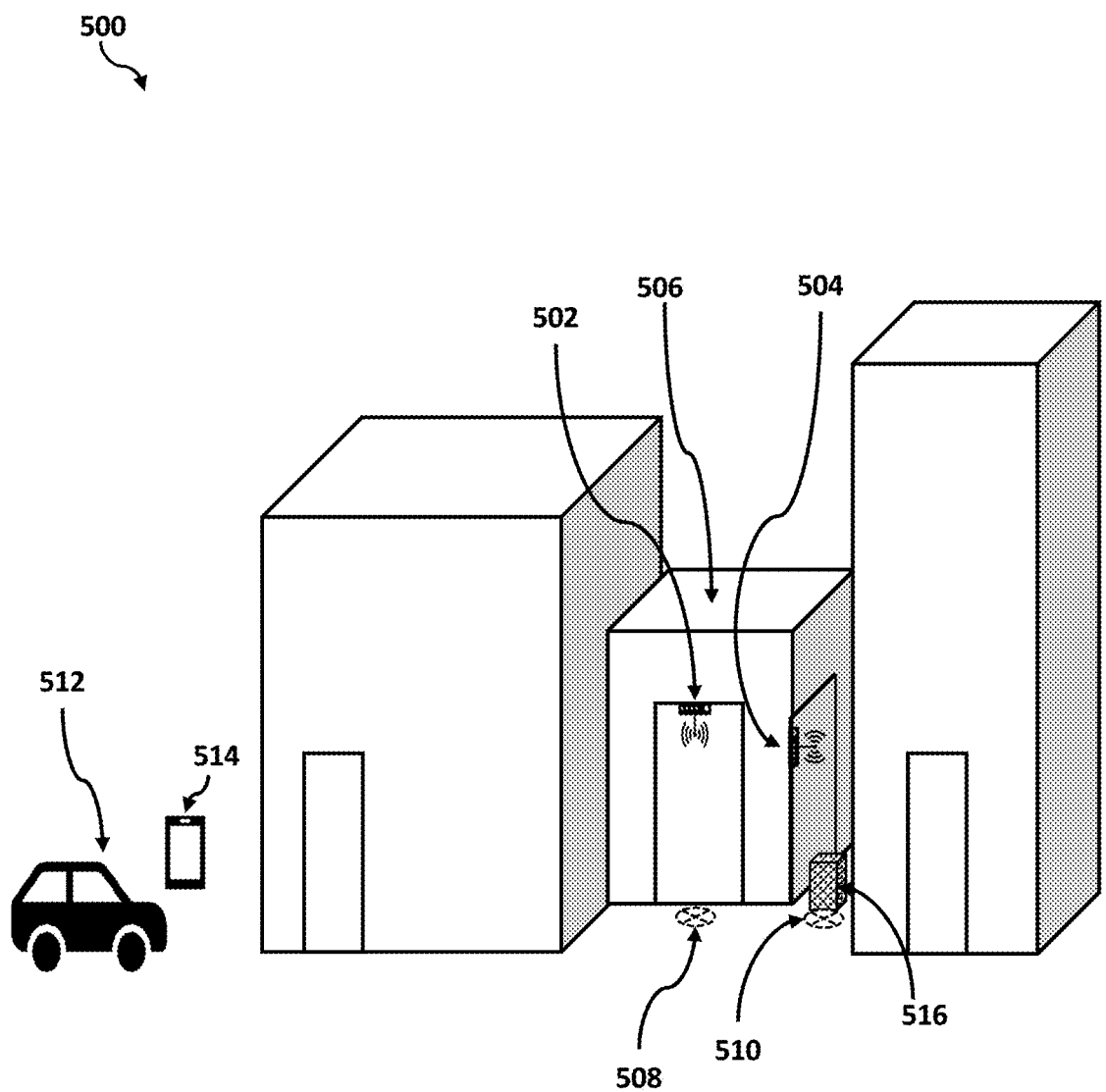
FIG. 5 is a diagram illustrating an exemplary delivery process used by a delivery program according to at least one embodiment.

Referring now to FIG. 5, a diagram 500 illustrating an exemplary delivery process used by the delivery program 110a, 110b according to at least one embodiment is depicted.

A user may affix two beacon units: a first beacon unit 502 and a second beacon unit 504 on exterior surfaces of the user's house 506. In one embodiment, the user may register the beacon units 502, 504 with an address of the house 506, as previously described with reference to FIGS. 2 and 3 (e.g., via companion application of the delivery program 110a, 110b running on the user device).

During the setup process, the companion application may enable the user to assign the beacon units 502, 504 to corresponding drop-off locations at the house 506. In the current example, the user may assign the first beacon unit 502 to a first drop-off location 508 and may assign the second beacon unit 504 to a second drop-off location 510 at the house 506. In one embodiment, the companion application may also enable the user to enter user preferences for when the first drop-off location 508 should be used and when the second drop-off location 510 should be used. In the current example, the user may enter user preferences indicating the use of the first drop-off location 508 for deliveries after 6 PM when the user may be at the house 506 and indicating the use of the second drop-off location 510 for deliveries before 6 PM when the user may be away from the house 506.

In one embodiment, the delivery program 110a, 110b may receive a first tag (e.g., first RFID tag) information including a "unique ID value A" from the first beacon unit 502 and a second tag (e.g., second RFID tag) information including a "unique ID value B" from the second beacon unit 504 during the setup process. The delivery program 110a, 110b may generate a user profile associated with the address of house 506. In one embodiment, the user profile may include the first and second beacon units 502, 504 and the corresponding first and second tag information as the registered beacon units associated with the address of house 506. In one embodiment, the delivery program 110a, 110b may also store the respective drop-off locations 508, 510 and the user preferences for when each drop-off location may be used. The delivery program 110a, 110b may store the user profile in a registered beacon database, as described previously with reference to FIGS. 2 and 3.

According to one embodiment, the user may request a delivery to the house 506. A carrier 512 may arrive at a location within a vicinity of the house 506 to attempt the delivery. In the current example, the user's street may not be logically number and the carrier 512 may not be able to find the house 506 using the address of the house 506. In one embodiment, the delivery program 110a, 110b may detect a carrier device 514 of the carrier 512 near the address of the house 506. In the current example, the carrier 512 may interact with a companion application (e.g., carrier delivery application 240) of the delivery program 110a, 110b running on the carrier device 514 to indicate the arrival of the carrier 512 near the house 506. In the current example, the carrier 512 may also indicate via the carrier device 514 that the carrier 512 is unable to find the house 506. In response, the delivery program 110a, 110b may query the registered beacon database to identify the registered beacons associated with the address of the house 506. In the current example, the delivery program 110a, 110b may determine that the house 506 includes two registered beacon units: the first beacon unit 502 and the second beacon unit 504. The delivery program 110a, 110b may also determine the user-selection for the second drop-off location 510 based on the current 10 AM delivery time. Accordingly, the delivery program 110a, 110b may transmit, to the carrier device 514, the second tag information including the "unique ID value B" of the second beacon unit 504 assigned to the second drop-off location 510. After receiving the "unique ID value B" of the second beacon unit 504 to the carrier device 514, the carrier 512 may interact with an RFID reader of the carrier device 514 to query (e.g., for directions) the RFID tag of the second beacon unit 504 using the "unique ID value B" of the RFID tag. In response, the second beacon unit 504 may transmit a distinguishable signal to direct the carrier 512 to the house 506. In the current example, the carrier 512 may follow the signal from the second beacon unit 504 to deliver a package 516 to the house 506, and more specifically, to the second drop-off location 510. The carrier 512 may interact with the second beacon unit 504 to signal the completed delivery. In response, the second beacon unit 504 may capture a photograph of the package 516 and communicate the delivery event to the delivery program 110a, 110b.

The functionality of a computer may be improved by the delivery program 110a, 110b because the delivery program 110a, 110b may enable communications between remote processing devices such as, for example, a beacon unit including an RFID tag and a carrier device including an RFID reader. The delivery program 110a, 110b may also improve the functioning of a computer because it may enable an RFID reader to singulate an RFID tag from multiple RFID tags in the coverage area of the RFID reader.

The delivery program 110a, 110b may be practiced in distributed cloud computing environments where tasks are performed by remote processing devices that may be linked through a communication network (e.g., communication network 116).

It may be appreciated that FIGS. 2 to 5 provide only an illustration of one embodiment and do not imply any limitations with regard to how different embodiments may be implemented. Many modifications to the depicted embodiment(s) may be made based on design and implementation requirements.

Figure 6:
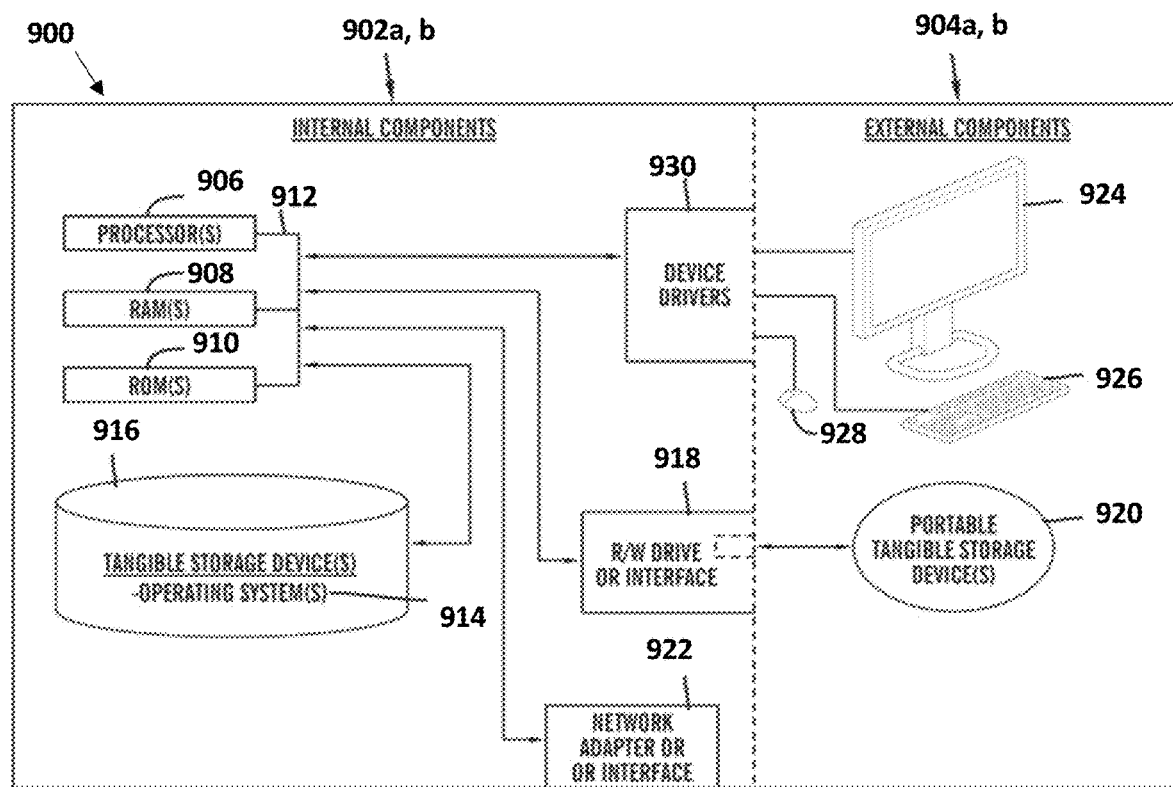
FIG. 6 is a block diagram of internal and external components of computers and servers depicted in FIG. 1 according to at least one embodiment.

FIG. 6 is a block diagram 900 of internal and external components of computers depicted in FIG. 1 in accordance with an illustrative embodiment of the present invention. It should be appreciated that FIG. 6 provides only an illustration of one implementation and does not imply any limitations with regard to the environments in which different embodiments may be implemented. Many modifications to the depicted environments may be made based on design and implementation requirements.

Data processing system 902, 904 is representative of any electronic device capable of executing machine-readable program instructions. Data processing system 902, 904 may be representative of a smart phone, a computer system, PDA, or other electronic devices. Examples of computing systems, environments, and/or configurations that may be represented by data processing system 902, 904 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

User client computer 102 and network server 112 may include respective sets of internal components 902 *a, b* and external components 904 *a, b* illustrated in FIG. 6. Each of the sets of internal components 902 *a, b* includes one or more processors 906, one or more computer-readable RAMs 908 and one or more computer-readable ROMs 910 on one or more buses 912, and one or more operating systems 914 and one or more computer-readable tangible storage devices 916. The one or more operating systems 914, the software program 108, and the delivery program 110a in client computer 102, and the delivery program 110b in network server 112, may be stored on one or more computer-readable tangible storage devices 916 for execution by one or more processors 906 via one or more RAMs 908 (which typically include cache memory). In the embodiment illustrated in FIG. 6, each of the computer-readable tangible storage devices 916 is a magnetic disk storage device of an internal hard drive. Alternatively, each of the computer-readable tangible storage devices 916 is a semiconductor storage device such as ROM 910, EPROM, flash memory or any other computer-readable tangible storage device that can store a computer program and digital information.

Each set of internal components 902 *a, b* also includes a R/W drive or interface 918 to read from and write to one or more portable computer-readable tangible storage devices 920 such as a CD-ROM, DVD, memory stick, magnetic tape, magnetic disk, optical disk or semiconductor storage device. A software program, such as the software program 108 and the delivery program 110a and 110b can be stored on one or more of the respective portable computer-readable tangible storage devices 920, read via the respective R/W drive or interface 918 and loaded into the respective hard drive 916.

Each set of internal components 902 a, b may also include network adapters (or switch port cards) or interfaces 922 such as a TCP/IP adapter cards, wireless wi-fi interface cards, or 3G or 4G wireless interface cards or other wired or wireless communication links. The software program 108 and the delivery program 110a in client computer 102 and the delivery program 110b in network server computer 112 can be downloaded from an external computer (e.g., server) via a network (for example, the Internet, a local area network or other, wide area network) and respective network adapters or interfaces 922. From the network adapters (or switch port adaptors) or interfaces 922, the software program 108 and the delivery program 110a in client computer 102 and the delivery program 110b in network server computer 112 are loaded into the respective hard drive 916. The network may comprise copper wires, optical fibers, wireless transmission, routers, firewalls, switches, gateway computers and/or edge servers.

Each of the sets of external components 904 a, b can include a computer display monitor 924, a keyboard 926, and a computer mouse 928. External components 904 a, b can also include touch screens, virtual keyboards, touch pads, pointing devices, and other human interface devices. Each of the sets of internal components 902 a, b also includes device drivers 930 to interface to computer display monitor 924, keyboard 926 and computer mouse 928. The device drivers 930, R/W drive or interface 918 and network adapter or interface 922 comprise hardware and software (stored in storage device 916 and/or ROM 910).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 7:
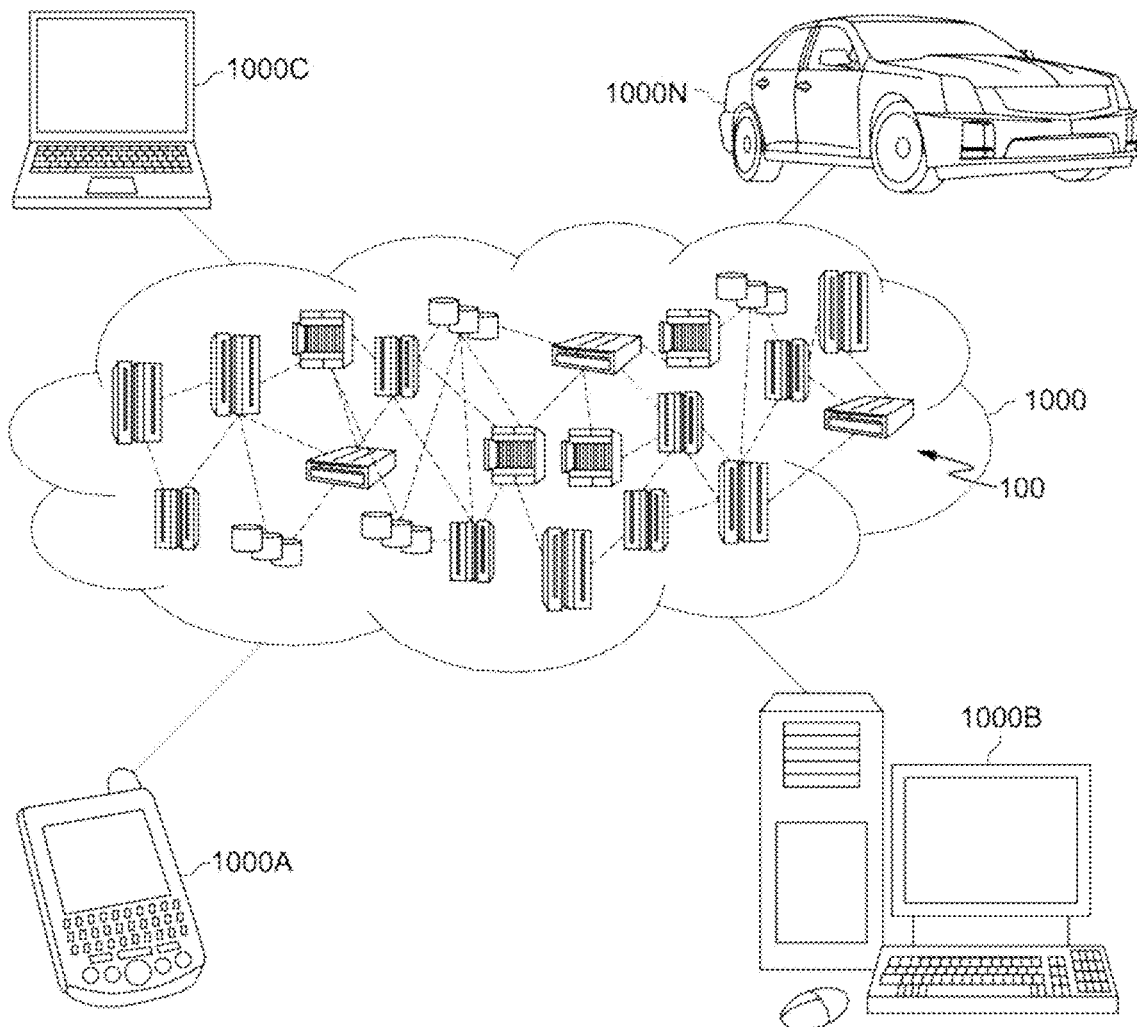
FIG. 7 is a block diagram of an illustrative cloud computing environment including the computer system depicted in FIG. 1, in accordance with an embodiment of the present disclosure.

Referring now to FIG. 7, illustrative cloud computing environment 1000 is depicted. As shown, cloud computing environment 1000 comprises one or more cloud computing nodes 100 with which local computing devices used by cloud consumers, such as, for example, personal digital assistant (PDA) or cellular telephone 1000A, desktop computer 1000B, laptop computer 1000C, and/or automobile computer system 1000N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 1000 to offer infrastructure, platforms and/or software as services for which a cloud consumer does not need to maintain resources on a local computing device. It is understood that the types of computing devices 1000A-N shown in FIG. 7 are intended to be illustrative only and that computing nodes 100 and cloud computing environment 1000 can communicate with any type of computerized device over any type of network and/or network addressable connection (e.g., using a web browser).

Figure 8:
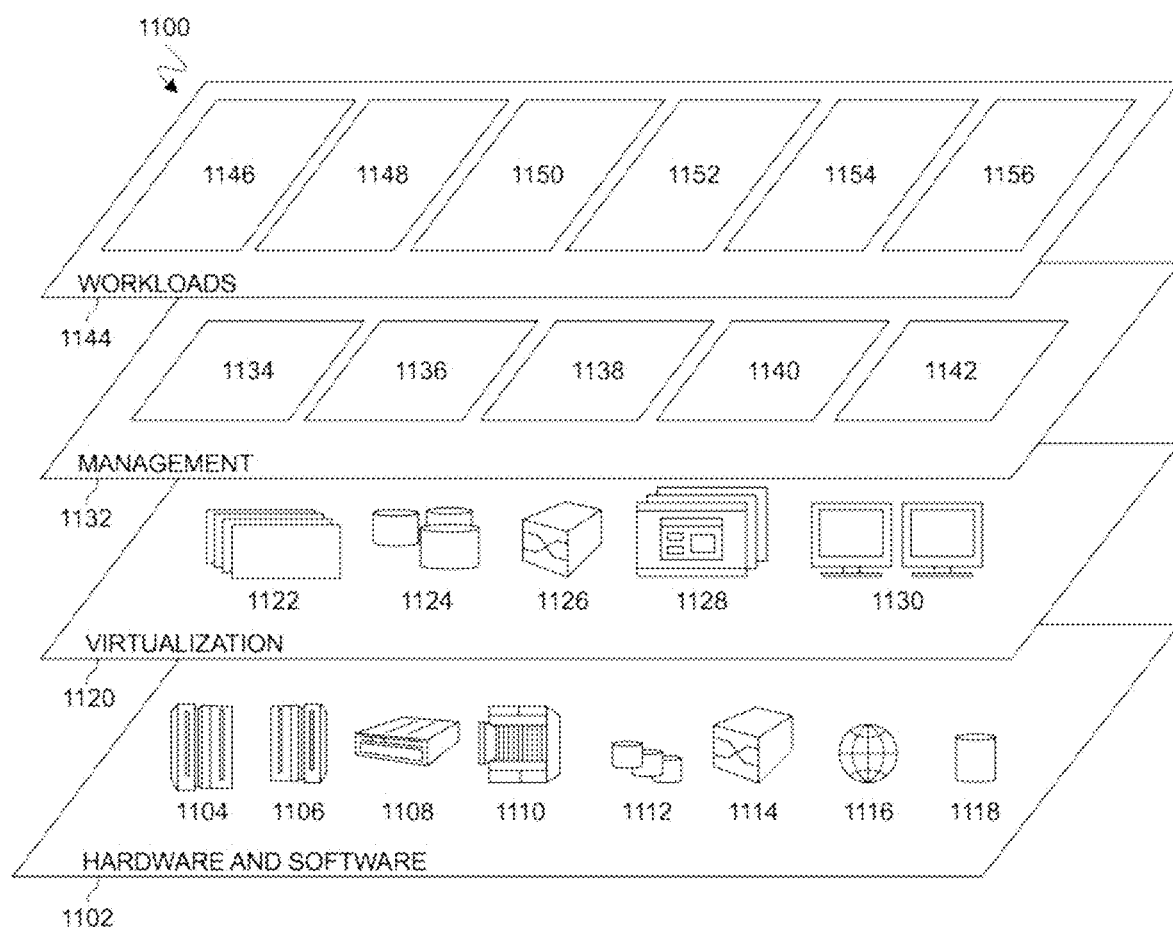
FIG. 8 is a block diagram of functional layers of the illustrative cloud computing environment of FIG. 7, in accordance with an embodiment of the present disclosure.

Referring now to FIG. 8, a set of functional abstraction layers 1100 provided by cloud computing environment 1000 is shown. It should be understood in advance that the components, layers, and functions shown in FIG. 8 are intended to be illustrative only and embodiments of the invention are not limited thereto. As depicted, the following layers and corresponding functions are provided:

Hardware and software layer 1102 includes hardware and software components. Examples of hardware components include: mainframes 1104; RISC (Reduced Instruction Set Computer) architecture based servers 1106; servers 1108; blade servers 1110; storage devices 1112; and networks and networking components 1114. In some embodiments, software components include network application server software 1116 and database software 1118.

Virtualization layer 1120 provides an abstraction layer from which the following examples of virtual entities may be provided: virtual servers 1122; virtual storage 1124; virtual networks 1126, including virtual private networks; virtual applications and operating systems 1128; and virtual clients 1130.

In one example, management layer 1132 may provide the functions described below. Resource provisioning 1134 provides dynamic procurement of computing resources and other resources that are utilized to perform tasks within the cloud computing environment. Metering and Pricing 1136 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 1138 provides access to the cloud computing environment for consumers and system administrators. Service level management 1140 provides cloud computing resource allocation and management such that required service levels are met. Service Level Agreement (SLA) planning and fulfillment 1142 provide pre-arrangement for, and procurement of, cloud computing resources for which a future requirement is anticipated in accordance with an SLA.

Workloads layer 1144 provides examples of functionality for which the cloud computing environment may be utilized. Examples of workloads and functions which may be provided from this layer include: mapping and navigation 1146; software development and lifecycle management 1148; virtual classroom education delivery 1150; data analytics processing 1152; transaction processing 1154; and delivery processing 1156. A delivery program 110a, 110b provides a way to direct a delivery to a specific drop-off location at a user address.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer implemented method, comprising:
receiving, by at least one registered beacon unit associated with a respective location at a target address, a direction query from a beacon reader within a vicinity of the target address, wherein the direction query includes a respective tag information to identify the at least one registered beacon unit and a request for directions to the respective location of the at least one registered beacon unit at the user address;
transmitting, by the at least one registered beacon unit, a plurality of audio signals to direct the beacon reader to the respective location of the at least one registered beacon unit at the target address;
detecting, by the at least one registered beacon unit, the beacon reader at the respective location of the target address;
in response to detecting the beacon reader at the respective location of the target address, capturing, by the at least one registered beacon unit, a photo of an object at the respective location; and
transmitting, by the at least one registered beacon unit, the captured photo of the object at the respective location of the target address.

2. The method of claim 1, further comprising:
receiving the respective tag information of the at least one registered beacon unit; and
associating the at least one registered beacon unit with the respective location at the target address.

3. The method of claim 1, further comprising:
receiving a request from the beacon reader to communicate with the at least one registered beacon unit associated with the target address.

4. The method of claim 1, wherein transmitting the respective tag information of the at least one registered beacon unit associated with the target address to the beacon reader further comprises:
determining a plurality of registered beacon units associated with the target address;
transmitting a list of the determined plurality of registered beacon units to the beacon reader, wherein the transmitted list indicates a plurality of respective locations corresponding to the determined plurality of registered beacon units; and
in response to receiving, from the beacon reader, a selected location based on the transmitted list, transmitting the respective tag information of the selected location at the target address.

5. The method of claim 1, wherein transmitting the respective tag information of the at least one registered beacon unit associated with the target address to the beacon reader comprises:
   determining a plurality of registered beacon units associated with the target address, wherein each registered beacon unit indicates the respective location at the target address;
   identifying a user-selected location from the determined plurality of registered beacon units; and
   transmitting, to the beacon reader, the respective tag information of the identified user-selected location at the target address.

6. The method of claim 1, further comprising:
   receiving, from the at least one registered beacon unit, a query to verify the beacon reader requesting directions to the at least one registered beacon unit; and
   in response to verifying the beacon reader, transmitting a verifying information to the at least one registered beacon unit.

7. The method of claim 1, wherein the at least one registered beacon unit includes a radio frequency identification (RFID) tag, wherein the respective tag information includes a unique identifier value to singulate the RFID tag, and wherein the beacon reader includes a RFID reader for communicating with the RFID tag using the unique identifier value.

8. A computer system for delivery, comprising:
   one or more processors, one or more computer-readable memories, one or more computer-readable tangible storage media, and program instructions stored on at least one of the one or more computer-readable tangible storage media for execution by at least one of the one or more processors via at least one of the one or more memories, wherein the computer system is capable of performing a method comprising:
   receiving, by at least one registered beacon unit associated with a respective location at a target address, a direction query from a beacon reader within a vicinity of the target address, wherein the direction query includes a respective tag information to identify the at least one registered beacon unit and a request for directions to the respective location of the at least one registered beacon unit at the user address;
   transmitting, by the at least one registered beacon unit, a plurality of audio signals to direct the beacon reader to the respective location of the at least one registered beacon unit at the target address;
   detecting, by the at least one registered beacon unit, the beacon reader at the respective location of the target address;
   in response to detecting the beacon reader at the respective location of the target address, capturing, by the at least one registered beacon unit, a photo of an object at the respective location; and
transmitting, by the at least one registered beacon unit, the captured photo of the object at the respective location of the target address.

9. The computer system of claim 8, further comprising:
   receiving the respective tag information of the at least one registered beacon unit; and
   associating the at least one registered beacon unit with the respective location at the target address.

10. The computer system of claim 8, further comprising:
    receiving a request from the beacon reader to communicate with the at least one registered beacon unit associated with the target address.

11. The computer system of claim 8, wherein transmitting the respective tag information of the at least one registered beacon unit associated with the target address to the beacon reader further comprises:
    determining a plurality of registered beacon units associated with the target address;
    transmitting a list of the determined plurality of registered beacon units to the beacon reader, wherein the transmitted list indicates a plurality of respective locations corresponding to the determined plurality of registered beacon units; and
    in response to receiving, from the beacon reader, a selected location based on the transmitted list, transmitting the respective tag information of the selected location at the target address.

12. The computer system of claim 8, wherein transmitting the respective tag information of the at least one registered beacon unit associated with the target address to the beacon reader comprises:
    determining a plurality of registered beacon units associated with the target address, wherein each registered beacon unit indicates the respective location at the target address;
    identifying a user-selected location from the determined plurality of registered beacon units; and
    transmitting, to the beacon reader, the respective tag information of the identified user-selected location at the target address.

13. The computer system of claim 8, further comprising:
    receiving, from the at least one registered beacon unit, a query to verify the beacon reader requesting directions to the at least one registered beacon unit; and
    in response to verifying the beacon reader, transmitting a verifying information to the at least one registered beacon unit.

14. The computer system of claim 8, wherein the at least one registered beacon unit includes a radio frequency identification (RFID) tag, wherein the respective tag information includes a unique identifier value to singulate the RFID tag, and wherein the beacon reader includes a RFID reader for communicating with the RFID tag using the unique identifier value.

15. A computer program product for delivery, the computer program product comprising:
    one or more computer-readable storage media and program instructions collectively stored on the one or more computer-readable storage media, the program instructions comprising:
    program instructions to receive, by at least one registered beacon unit associated with a respective location at a target address, a direction query from a beacon reader within a vicinity of the target address, wherein the direction query includes a respective tag information to identify the at least one registered beacon unit and a request for directions to the respective location of the at least one registered beacon unit at the user address;
    program instructions to transmit, by the at least one registered beacon unit, a plurality of audio signals to direct the beacon reader to the respective location of the at least one registered beacon unit at the target address;

program instructions to detect, by the at least one registered beacon unit, the beacon reader at the respective location of the target address;

program instructions to capture, by the at least one registered beacon unit, a photo of an object at the respective location in response to detecting the beacon reader at the respective location of the target address; and program instructions to transmit, by the at least one registered beacon unit, the captured photo of the object at the respective location of the target address.

16. The computer program product of claim 15, further comprising:

program instructions to receive the respective tag information of the at least one registered beacon unit; and program instructions to associate the at least one registered beacon unit with the respective location at the target address.

17. The computer program product of claim 15, further comprising:

program instructions to receive a request from the beacon reader to communicate with the at least one registered beacon unit associated with the target address.

18. The computer program product of claim 15, wherein program instructions to transmit the respective tag information of the at least one registered beacon unit associated with the target address to the beacon reader further comprises:

program instructions to determine a plurality of registered beacon units associated with the target address;

program instructions to transmit a list of the determined plurality of registered beacon units to the beacon reader, wherein the transmitted list indicates a plurality of respective locations corresponding to the determined plurality of registered beacon units; and program instructions to, in response to receiving, from the beacon reader, a selected location based on the transmitted list, transmitting the respective tag information of the selected location at the target address.

* * * * *